United States Patent [19]
Hamilton, Jr.

[11] 3,782,747
[45] Jan. 1, 1974

[54] CONNECTION OF ADVERTISING CARDS TO CARTS

[76] Inventor: Otis T. Hamilton, Jr., 7158 Macapa Dr., Hollywood, Calif. 90028

[22] Filed: Mar. 29, 1972

[21] Appl. No.: 239,258

[52] U.S. Cl. ............................ 280/33.99 A, 40/308
[51] Int. Cl. ............................................ B62b 11/00
[58] Field of Search ............... 280/33.99 A, DIG. 4; 40/308, 128, 125 R, 16, 23

[56] References Cited
UNITED STATES PATENTS

| | | | |
|---|---|---|---|
| 2,932,105 | 4/1960 | Hawk, Jr. et al. | 40/308 |
| 2,825,163 | 3/1958 | Peretti | 40/308 |
| 2,723,474 | 11/1955 | Minter | 280/33.99 A X |
| 2,845,729 | 8/1958 | Baumgart | 280/33.99 A X |
| 2,895,243 | 7/1959 | Hummer et al. | 280/33.99 A X |
| 2,831,599 | 4/1958 | Graffeo | 280/33.99 A X |

FOREIGN PATENTS OR APPLICATIONS 1,380,595 10/1964 France ........................ 280/33.99 A

*Primary Examiner*—Leo Friaglia
*Assistant Examiner*—David M. Mitchell
*Attorney*—William W. Haefliger et al.

[57] ABSTRACT

An advertising card, for use on a shopping cart, has integral tabs projecting at the card periphery; the tabs are spaced and sized to be received in the spaces between the rods when folded over cart receptacle horizontal rod structure; and adhesive means is located on the card to adhesively join portions of the folded-over tabs to the card when those portions are pressed toward the main body of the card.

4 Claims, 6 Drawing Figures

PATENTED JAN 1 1974
3,782,747
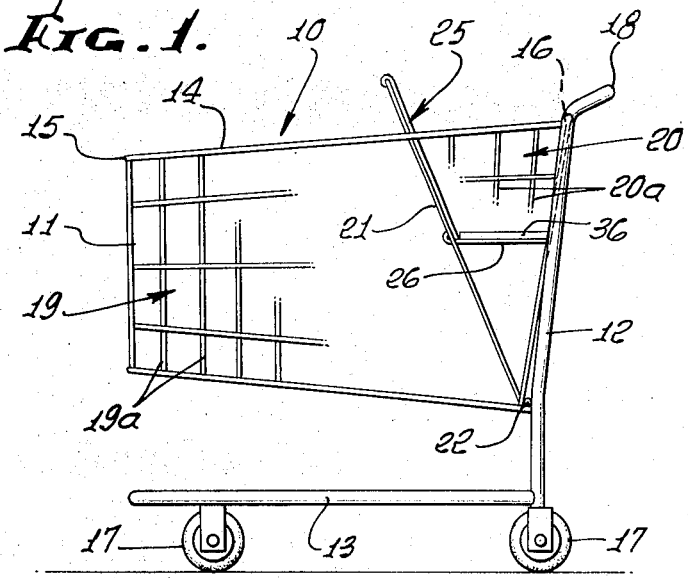
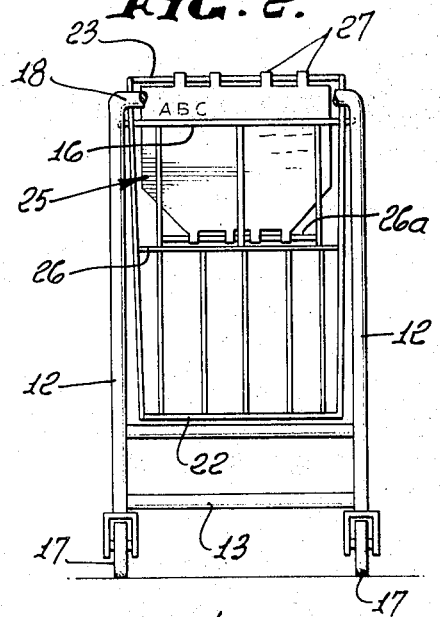
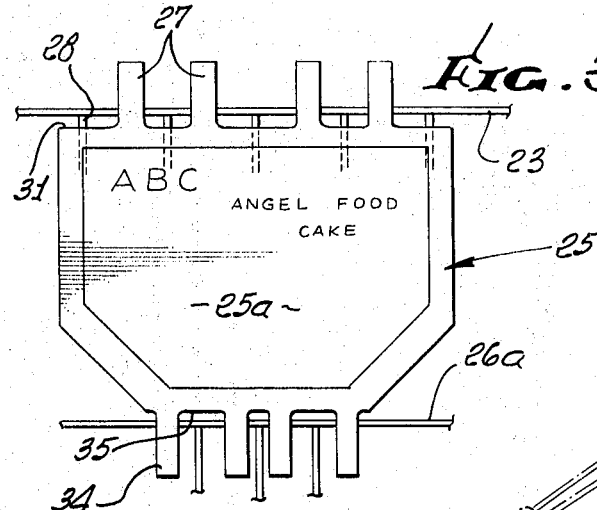
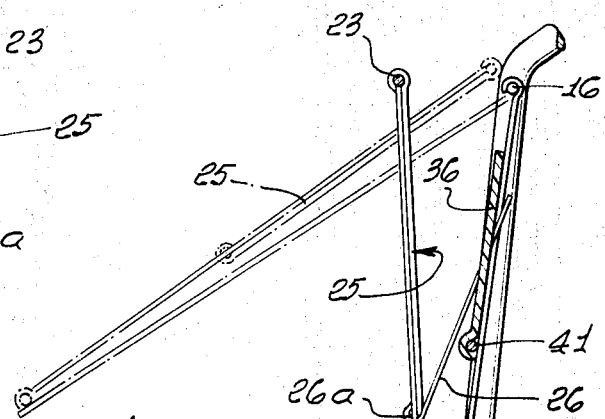
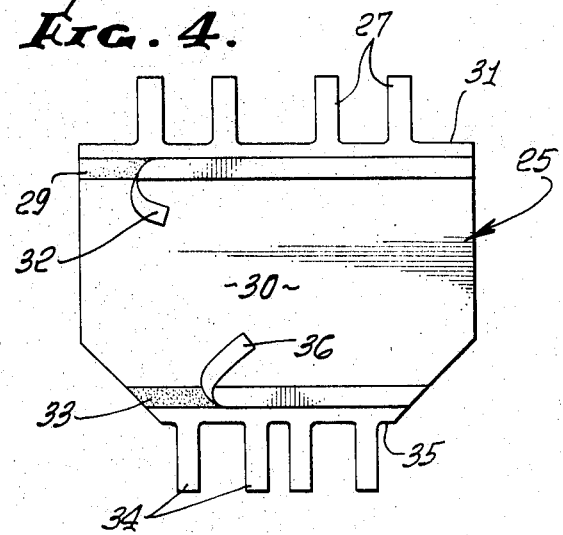
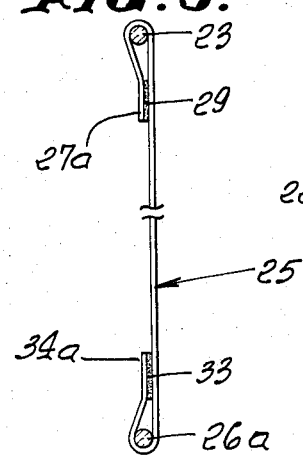

CONNECTION OF ADVERTISING CARDS TO CARTS

BACKGROUND OF THE INVENTION

This invention relates generally to advertising displays. More particularly it concerns the incorporation on a cart of a periodically removable or replaceable card and in such manner that advertising on the card is displayed to best advantage in terms of protection of the advertising medium, and also as respects inescapable direct and personal exposure to the shopper during the entire shopping period.

The display of the merchandise in self service stores, as for example, food markets, to best advantage as respects sales promotion is a constant problem. For example, in each store there will be certain preferred shopping areas, and suppliers will seek to have their wares displayed in such an area and at the most advantageous height to attract the shopper. Considering the limited extent of such areas, there is consequently a need for advertising displays which are most effective in stores and yet not restricted to the preferred "shelf space" zones.

SUMMARY OF THE INVENTION

It is a major object of the invention to meet the above described need through provision of an advertising display or displays which the shopper cannot fail to observe as he walks about the store with his shopping cart. Other objects include the provision of such displays on shopping carts and in such manner as enable them to be rapidly installed and changed at frequent intervals, and the provision of display cards with supporting tabs at very low cost per time interval of exposure.

The cards and tabs are adapted for use in combination with carts usable in markets, such a cart having a frame supported on wheels, a rear handle, a forward or main receptacle for articles and a rear or reduced size receptacle for articles, and separator structure between the forward and rear receptacles. As will be seen, and in accordance with the invention, a card having space for advertising is removably supported by tabs connected onto the receptacle, as for example the separator structure, and so that the card hangs downwardly with the advertising space presented rearwardly toward the cart handle. As a result, the shopper pushing the cart cannot fail to view the advertising on the card for his entire shopping period, and the advertising message becomes individualized, demanding the shopper's undistracted attention. This is seen to be much more advantageous than radio or television advertising because of the greater time exposure to the shopper, and without "entertainment" intervals.

Further, the card has integral tabs projecting at the card periphery, the tabs spaced and sized to be received in the spaces between receptacle upright rods when folded over horizontal rod structure and back toward the card for adhesive connection thereto, adhesive means being located on the card, as for example on the main body thereof. The adhesive may be defined by a strip extending on the card body and parallel to a row of tabs, and multiple adhesive strips may be employed to fasten multiple rows of folded tabs to the card body, as will be seen. This enables very quick and positive attachment of the cards to a grocery cart and subsequent removal. The use of such cards has been demonstrated to improve sales of advertised merchandise by much more than 100 percent.

These and other objects and advantages of the invention, as well as the details of an illustrative embodiment, will be more fully understood from the following description and drawings, in which:

DRAWING DESCRIPTION

FIG. 1 is a side elevation showing a cart incorporating the invention;

FIG. 2 is a rear elevation of the FIG. 1 cart;

FIG. 3 is an enlarged elevation showing the rearward facing side of a typical card;

FIG. 4 is an elevation showing the opposite side of the FIG. 3 card;

FIG. 5 is an end elevation showing tab attachment of the card to rod structure; and FIG. 6 is a side elevation showing card disposition during separator collapse and swinging.

DETAILED DESCRIPTION

In FIGS. 1 and 2, one form of shopping cart with which the card and hanger means may be combined is shown at 10, with frame members 11–16, wheels 17 supporting the frame, and a rear transverse handle 18 connected with the frame. A main or forward receptacle 19 for selected articles may be formed as by open-work wire enclosure 19a; and a reduced size rearward and upper receptacle 20 for selected articles may be formed as by open-work wire enclosure 20a. Separator structure indicated at 21 within the cart separates these forward and rearward enclosures; and may be hinged to the frame as at 22 to pivot rearwardly for collapsing the receptacle space 20 and enlarging space 19. Such separator structure normally includes a transverse rod or bar 23 carried by the separator structure, as shown.

As also appears in the drawings, a card or sheet 25 which may be relatively stiff, has advertising space on its face 25a which is presented rearwardly (toward handle 18). The card extends transversely across approximately the full width of the interior of the rear receptacle or enclosure 20, and vertically approximately the full depth of that receptacle, i.e., downward into proximity with bottom grid or seat 26.

Further, the card 25 has integral tabs 27 projecting at the card upper periphery, the tabs spaced and sized to be received in the spaces between vertical rods 28 of the separator when folded over the horizontal rod 23 and back down and toward the card for connection thereto. In this regard, adhesive means is located on the card to adhesively join portions of the folded-over tabs to the card. For example, as seen in FIGS. 4 and 5, a first adhesive strip 29 extends on the card reverse side 30 generally parallel to the row of tabs, and at a distance from the upper edge 31 of the card to be fully engaged by end portions 27a of the tabs folded over bar 23. A usable adhesive is known commercially as Dubl-Stik Tape, a product of Kleenstik Products, Newark, N. J., and is adapted to firmly adhere to the tab portions 27a when pressed against the adhesive, after prior pull-off removal of a protective cover strip 32.

A second and similar adhesive strip 33 may be employed on the main body of the card to extend parallel to a second row of tabs 34, the latter projecting generally oppositely relative to the first row of tabs 27. The adhesive 33 is shown to be located at a distance from the lower edge 35 of the card so as to be fully engaged by end portions 34a of the lower tabs folded over lower horizontal bar 26a of the separator structure. Protective strip 36 covers the adhesive 33 until pulled off just prior to attachment of the card to the cart structure, such attachment being made possible in a very rapid manner due to the extreme simplicity of the overall card construction. Also, quick tear-off removal of the card from the bars 23 and 26a is facilitated by the integral tab construction.

FIG. 6 shows separator 21 being swung rearwardly about hinge location 22, and toward the rearward frame member 12, thereby to collapse the rear receptacle 20. Note that the card 25 remains upright and that the bottom grid 26 tilts upwardly about transverse hinge location 26a. A seat 36 that may rest on grid 26 in FIG. 1 position is shown folded upwardly about hinge location 41 in FIG. 6.

I claim:

1. For combination with a shopping cart usable in markets and having a frame, wheels supporting the frame, a handle, and article receptacle means carried by the frame and defined by generally horizontal and upright rod structure, the upright rod structure including horizontally spaced vertical rods, the improvement comprising
   a. an upright card having an unfolded body with opposite faces on one of which advertising space is provided,
   b. the card having integral tabs projecting upwardly in a first horizontal row from the upper edge of the body, the tabs horizontally spaced and sized to be received in the spaces between the rods when folded over receptacle horizontal rod structure and back down toward the card body for connection thereto, thereby to support the card to extend upright directly adjacent the rod structure in such position that the advertising space may be received by the shopper moving the cart about the market, and
   c. adhesive means located on the body opposite face to adhesively join free end portions of the folded over tabs to the body when said portions are pressed toward the body, said adhesive means defining a first strip extending generally horizontally and parallel to the tab row, but below the level of said row.

2. The improvement of claim 1 wherein the card also defines a second horizontal row of tabs projecting downwardly generally oppositely relative to first row tabs, and the adhesive means defines a second horizontal strip extending on the body generally parallel to and above the second row of tabs to attach the free ends of the second row tabs to the body when said free ends are folded up toward the body.

3. The combination of claim 1 wherein the card is attached to the cart via the receptacle horizontal rod structure forwardly of the handle, the advertising space facing rearwardly, whereby the card is inescapably viewed by the shopper during his extended tour with the cart in the market.

4. The improvement of claim 3 wherein said rod structure includes upper and lower horizontal rods, the first row tabs folded over the upper rod and adhesively joined to said first strip, and the second row tabs folded over the lower rod and adhesively joined to said second strip.

* * * * *